(12) United States Patent
Munson et al.

(10) Patent No.: US 6,295,085 B1
(45) Date of Patent: Sep. 25, 2001

(54) METHOD AND APPARATUS FOR ELIMINATING FLICKER EFFECTS FROM DISCHARGE LAMPS DURING DIGITAL VIDEO CAPTURE

(75) Inventors: Bill Munson, Portland, OR (US); Jack Heller, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/986,496

(22) Filed: Dec. 8, 1997

(51) Int. Cl.[7] .................................................. H04N 9/73
(52) U.S. Cl. ........................... 348/226; 348/241; 348/370
(58) Field of Search ........................................ 348/222, 223, 348/224, 225, 226, 227, 229, 255, 370, 363, 366, 371; H04N 9/73

(56) References Cited

U.S. PATENT DOCUMENTS 5,003,378 * 3/1991 Murao .................................. 348/226
5,239,368 * 8/1993 Suzuki et al. ....................... 348/226
5,293,238 * 3/1994 Nakamo et al. .................... 348/226

* cited by examiner

*Primary Examiner*—Tuan Ho
(74) *Attorney, Agent, or Firm*—Blakely, Sokoloff, Taylor & Zafman LLP

(57) ABSTRACT

What is disclosed is a method and apparatus for eliminating the oscillating effect of a light source. The method having the first step of detecting a set of light intensity levels. Then, the method continues by generating a set of pulses based on the set of light intensity levels. The method then determines an oscillating frequency of the light source based upon the set of pulses. The apparatus has a light sensitive diode for detecting a light intensity level from a light source; a level detector coupled to the light sensitive diode for comparing the detected light intensity level with a predetermined level and a pulse generator coupled to the level detector for generating a set of pulses based on an output from the level detector; and, a signal processing unit coupled to the pulse generator to determine an oscillating frequency of the light source.

10 Claims, 5 Drawing Sheets

METHOD AND APPARATUS FOR ELIMINATING FLICKER EFFECTS FROM DISCHARGE LAMPS DURING DIGITAL VIDEO CAPTURE

BACKGROUND

1. Field of the Invention

The present invention relates to the field of use of digital video capture. More particularly, the present invention relates to method and apparatus for eliminating flicker effects from discharge lamps during digital video capture.

2. Description of Related Art

Digital cameras are currently being used in many applications, including both still image and video acquisition. To acquire images, digital cameras utilize a sensor array made up of an arranged pattern of photodiodes (i.e., light sensitive diodes, or, photosensors). Each photodiode measures the amount of light it receives by storing a corresponding amount of charge on an integrated capacitor. The amount of charge stored by each photodiode is then converted into a digital value by an analog-to-digital converter such that all the digital values, after being converted and reassembled into a particular array, can be processed to arrive at a digital image.

Typically, the photosensor array is exposed to the scene to be captured through the use of either a mechanical or electronic shutter that allows either (1) light to fall upon the photosensor array, or (2) charge to accumulate on each photosensor in the array, respectively. The photosensor array can either capture the charge in a row-by-row fashion as in the latter case, or, alternatively, in the former case, the image can be captured as a whole (i.e., the photosensor array is exposed to a light source all at once). The processing of the charges which are stored on each of the photosensors is then performed either in a row-by-row fashion, or in a pixel-by-pixel fashion. For video image capture applications, a series of frames (i.e., images) are captured similar to the manner above.

As digital cameras are positioned to replace traditional film-based cameras, they must be capable of operating under a variety of lighting situations. For example, digital cameras must be able to capture videos of scenes which are illuminated by sunlight, if outdoors, or which are illuminated by incandescent or fluorescent lights, if indoors.

However, when capturing a sequence of frames under an environment lighted by a discharge lamp (e.g., a fluorescent light), the digital video will contain artifacts due to the fact that the discharge lamp can vary in intensity and color temperature as a function of time. Thus, discharge lamps such as fluorescent lights does not offer a constant intensity of light but instead offers an intensity which, if measured and plotted on a chart, resembles a full wave rectified sine wave.

FIG. 1 shows an example of the intensity of fluorescent lighting as it varies over time, where the Y-axis represents the intensity of the light sensed by the photodiode, and the X-axis represents the passage of time. As can be seen by FIG. 1, the intensity of the light generated by fluorescent lighting (and thus sensed by the photodiode) is periodic and resembles the absolute values of a sine wave. As the variation of the intensity is a function of time, a video stream that is captured in this lighting will include a potentially considerable amount of variation in the quality of the captured video as the capture is also a function of time.

The problem is also compounded in the fact that the variation in the intensity of the fluorescent lighting is different in different parts of the world as some countries use a 60 Hz alternating current (AC) power system and other countries use a 50 Hz AC power system. For example, the United States uses an AC power system which oscillates at 60 Hz. Thus, depending on the country in which the digital camera is used, the frame capture rate will have to be adjusted such that the frame capture rate is a function of the operating cycle of the power supply.

One approach that allows a digital camera to function under the fluorescent lighting of different power systems is to have the user enter a code designating the country in which the digital camera will be used. The camera would then adjust the frame capture rate according to the operating frequency of the country. The camera would maintain a list of correspondences between the regions in which it is currently operating and also what power system is functional in that region. Also, this approach will require the user to input a code every time a user entered a region with a different power system. Thus, this approach would require that the user manually enter the user's current location.

A second approach would be to incorporate a system into the camera itself, such as a global positioning system (GPS), which would allow the camera to be "self-aware" as to which geographic location it is in and thus automatically sets the camera's internal systems accordingly. However, this approach would require additional circuitry which would place additional power and cost requirements into the digital camera.

Yet another approach would be to include circuitry to have the camera automatically recognize the power system in which it is currently operating by having the user plug the camera into the power system of the country. For example, when a user reaches a certain location or a new region, the user would simply plug the camera into a wall outlet to allow the circuitry of a digital camera to register the operating cycle of the power system. However, this approach is also not recommended as different regions around the world usually have different configurations of wall sockets and connectors on those sockets such that the user would have to carry along a set of adapters, which could number into the tens or hundreds, to be sure that the user can plug the digital camera into the power system.

It would be preferable to have a system which eliminates the effects of using fluorescent lighting that does not require user intervention or increased cost and power requirements on the camera itself.

SUMMARY

A method and apparatus for eliminating the oscillating effect of a light source. The method having the first step of detecting a set of light intensity levels. Then, the method continues by generating a set of pulses based on the set of light intensity levels. The method then determines an oscillating frequency of the light source based upon the set of pulses. The apparatus has a light sensitive diode for detecting a light intensity level from a light source; a level detector coupled to the light sensitive diode for comparing the detected light intensity level with a predetermined level and a pulse generator coupled to the level detector for generating a set of pulses based on an output from the level detector; and, a signal processing unit coupled to the pulse generator to determine an oscillating frequency of the light source.

DETAILED DESCRIPTION OF THE INVENTION

The present invention provides a method and apparatus for eliminating the flicker from discharge lamps in a captured video stream. For purposes of explanation, specific embodiments are set forth to provide a thorough understanding of the present invention. However, it will be understood by one skilled in the art, from reading this disclosure, that the invention may be practiced without these details. Further, although the present invention is described through the use of CMOS image sensor, most, if not all, aspects of the invention apply to image sensors in general. Moreover, well-known elements, devices, process steps and the like are not set forth in detail in order to avoid obscuring the present invention.

As the intensity and color value output from a fluorescent lamp varies in a sinusoidal, therefore periodic fashion, due to the applied AC voltage, the present invention utilizes a photodiode to detect the peak (or conversely, the minimum) light output from a discharge lamp (such as a fluorescent lamp), and then uses the output of the photodiode to synchronize the arrays scanning timing such that each array element (i.e., each photodiode) receives light from the scene illuminated at the same light level from the discharge lamp. In addition, the timing allows the photosensor array to capture each frame at approximately the same time in the cycle of the oscillation of the light intensity received from the fluorescent lamp. In one embodiment of the invention, a photodiode which is used to detect the illumination level is integrated on the same integrated circuit as the scanning photodiode array. This allows the photodiode array to be directed towards the same direction to which the array is pointing as the diode is located adjacent to the image sensor array.

In another embodiment, the photosensor is located among the sensors in the photosensor array. In this embodiment, the photodiode would require a separate amplification circuit as a separate, larger, photodiode which would normally be used can not be used. Thus, the photodiode would be smaller in sensor surface area than the photodiode that would be preferred in gathering the illumination projected by the fluorescent lighting.

Figure 1:
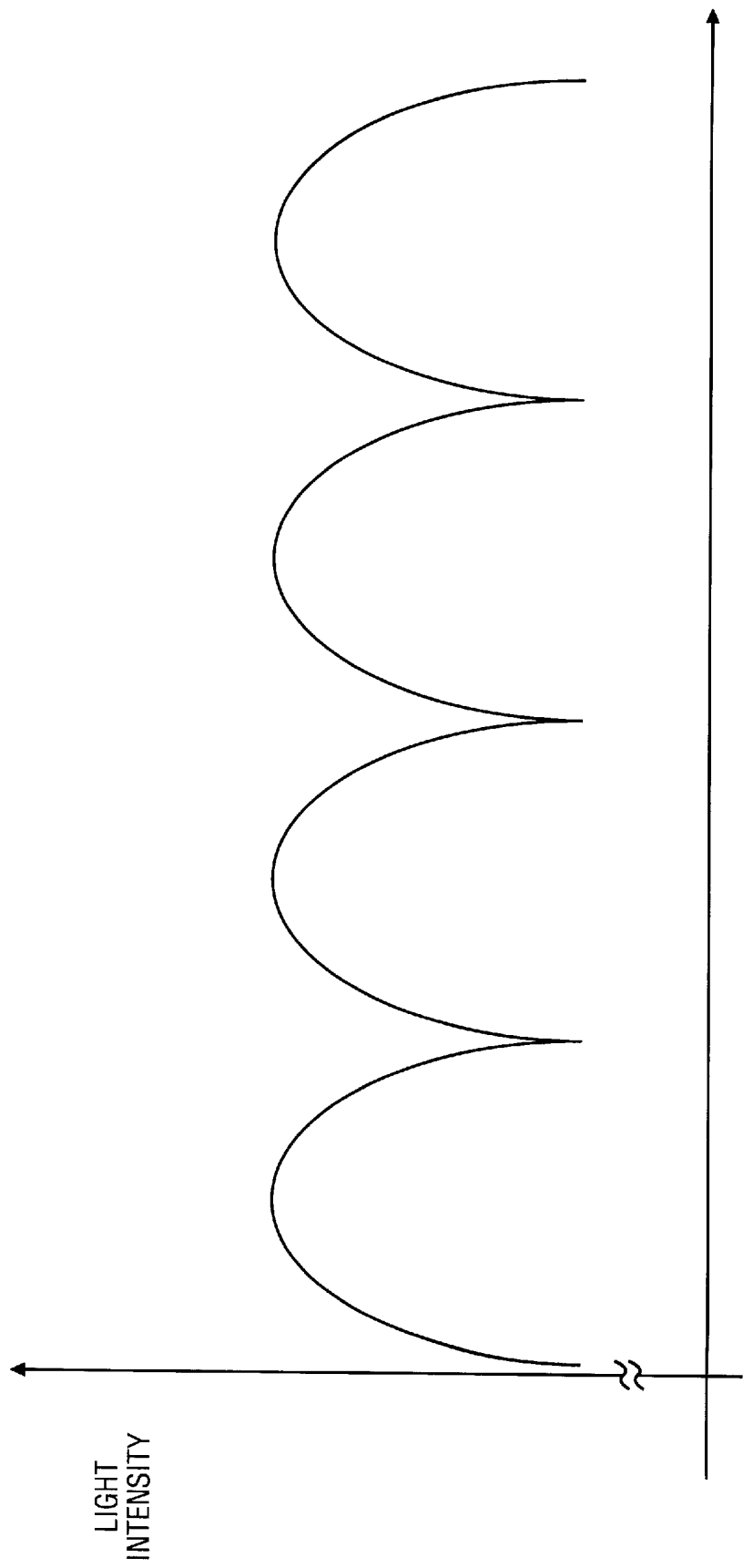
FIG. 1 is a plot of the light intensity from a discharge lamp measured over time.
Figure 2:
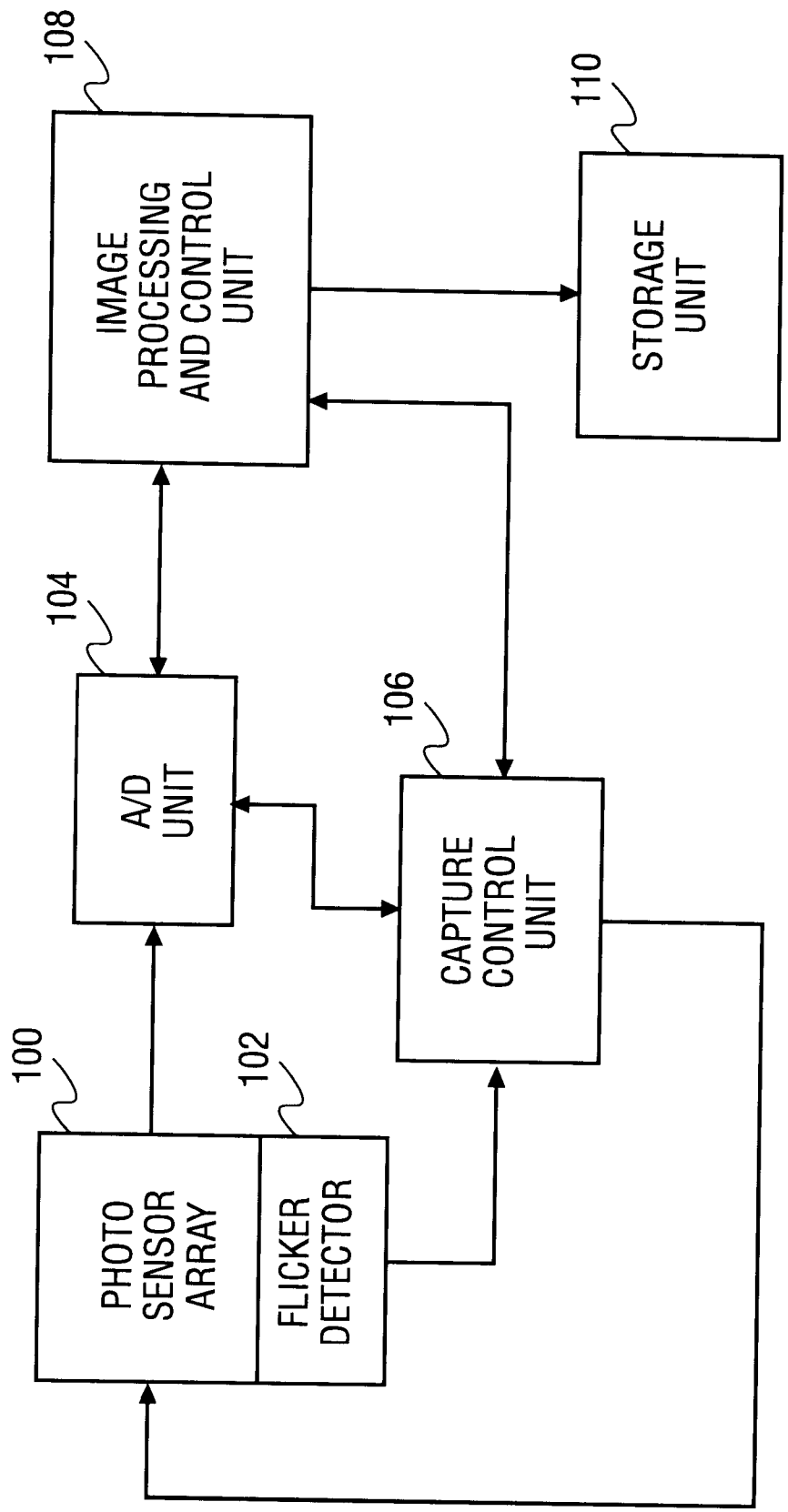
FIG. 2 is an image capture system configured according to one embodiment of the present invention which includes a flicker detector.

FIG. 2 is a block diagram of an image capture and processing system configured in accordance with one embodiment of the present invention with a photosensor array 100, a flicker detector 102, an analog-to-digital (A/D) unit 104, a capture control unit 106, an image processing and control unit 108, and a storage unit 110.

Photosensor array 100 and flicker detector 102 are, in one embodiment, located closely in physical proximity. Flicker detector 102 is integrated into the same CMOS integrated circuit as photosensor array 100. This is so flicker detector 102 can be exposed to the same light as photosensor array 100 to capture the most accurate environmental conditions from the point of view of photosensor array 100. The output of photosensor array 100 is fed into A/D unit 104. Photosensor array 100 outputs the capture charges based on the control signals sent by capture control unit 106 to A/D unit 104 for processing. Capture control unit 106 is controlled in turn by image processing and control unit 108 which is also interfaced with AID unit 104 to receive the data from A/D unit 104. Once image processing and control unit 108 receives the captured image, it performs any processing that is necessary and then sends the results to storage unit 110. Storage unit 110 can be any media suited for storing digital data. In one embodiment, storage unit 110 is a flash memory. However, any storage facility used for storing digital data will be suited, whether it is volatile or involatile memory.

Figure 3:
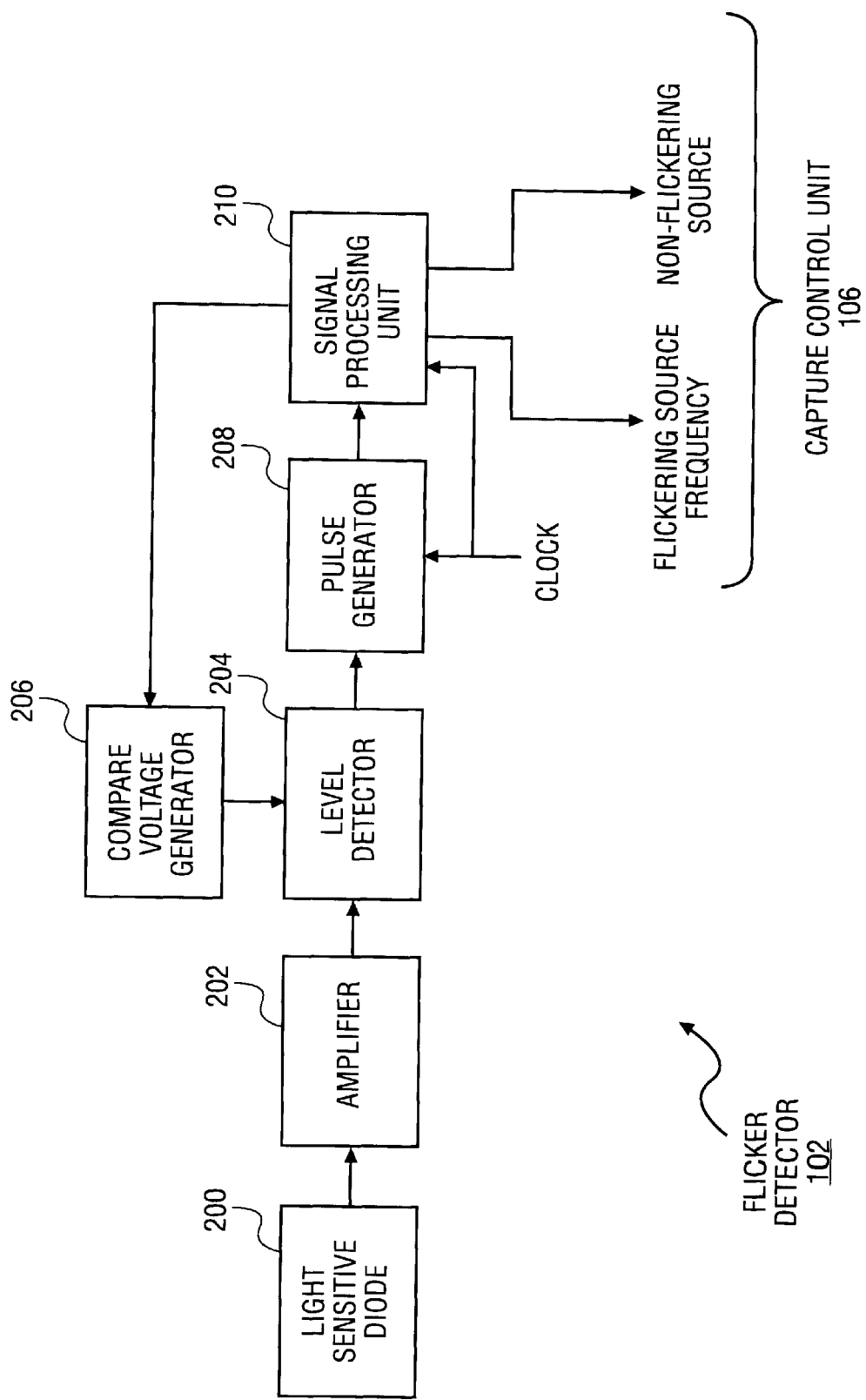
FIG. 3 is a block diagram of a flicker detector configured in accordance to one embodiment of the present invention.

FIG. 3 is a block diagram of one preferred embodiment of the flicker detector 102 having a light sensitive diode 200, an amplifier 202, a level detector 204, a compare voltage generator 206, a pulse generator 208, and a signal processing unit 210.

Light sensitive diode 200, in one preferred embodiment, is larger in surface area than the light sensitive diodes in photosensor array 100. This allows light sensitive diode 200 to be more sensitive to the surrounding light environment and therefore obtain a more accurate reading. Light sensitive diode 200 is coupled to amplifier 202 so that the signal received from light sensitive diode 200 can be increased in value even further. Amplifier 202 is coupled to level detector 204 which receives the signal from amplifier 202 and compares the voltage level of the signal received to the voltage generated by compare voltage generator 206. Level detector 204 will generate a signal whenever the voltage received from amplifier 202 is greater than the voltage received from the compare voltage generator 206. Level detector 204 uses pulse-generator 208 to generate a "clean" digital pulse from the output level detector 204. Pulse generator 208 receives a CLOCK signal which allows it to generate pulses in synchronization with the system clock.

Signal processing unit 210 also receives the CLOCK signal in addition to receiving the pulses generated by pulse generator 208. Signal processing unit 210 also controls compare voltage generator 206 to vary the compare voltage as described below. Signal processing unit 210 generates a set of signals to capture control unit 106 that identifies the camera as operating under an environment which is lighted by a discharge lamp (i.e., a flickering source), or a non-flickering light source. For example, signal processing unit 210 can output a first signal if the camera is operating in a scene that is lit by a discharge lamp powered under a 50 Hz power system, or, alternatively, under a 60 Hz power system. As described above, the components in flicker detector 102 is created using the same CMOS process as photosensor array 100. Thus, cost savings are achieved when the photosensor array has an integrated flicker detector. In addition, it is to be noted that A/D unit 104, capture control unit 106, image processing and control unit 108, and storage unit 110 can also be fully integrated into the same CMOS process as photosensor array 100 or be located on another integrated circuit.

Figure 4:
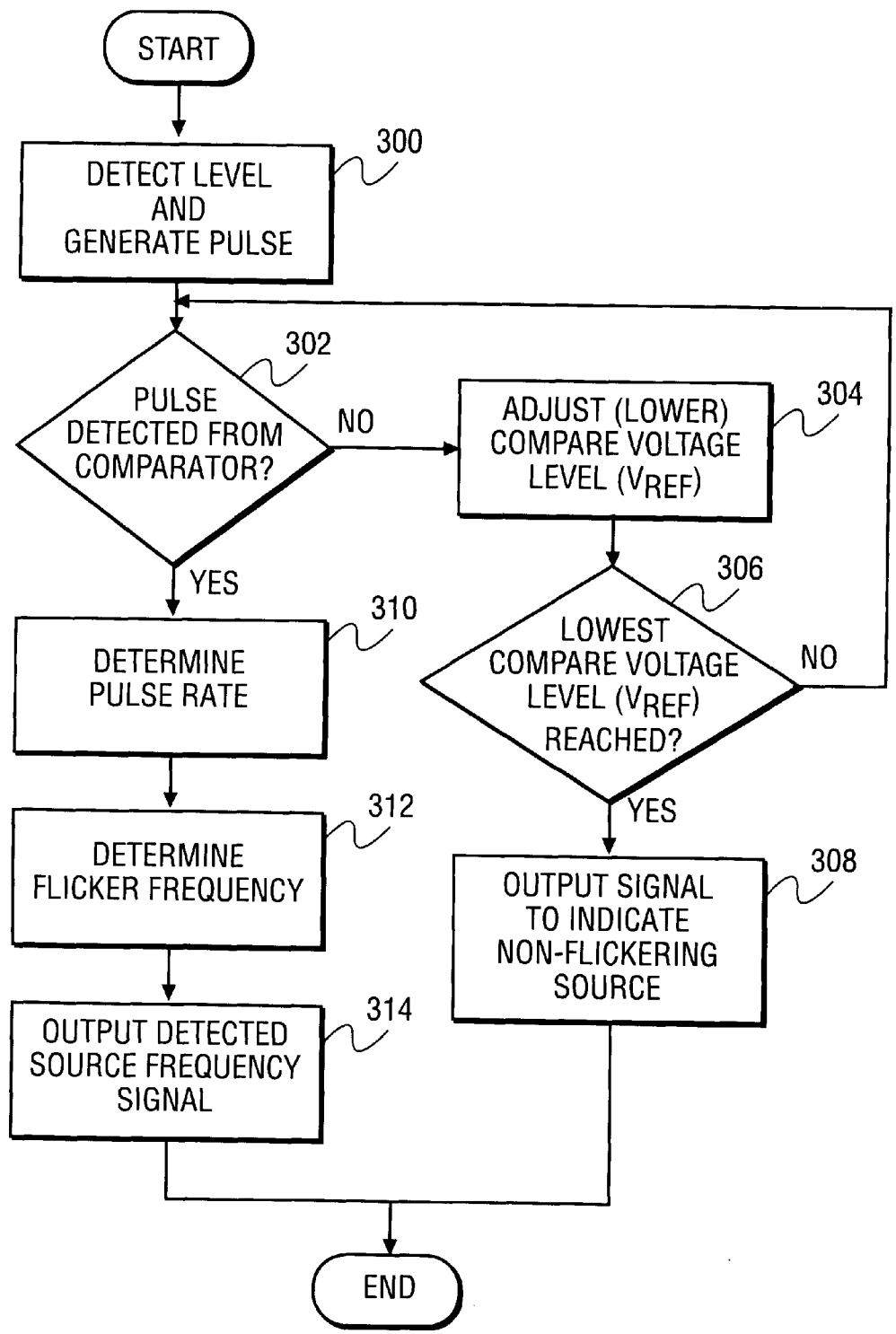
FIG. 4 is a flow diagram the operation of one embodiment of the present invention in determining the oscillating frequency of the intensity from a light source.

FIG. 4 is a flow chart of one embodiment of the operation of the present invention. The process begins with step 300, during which the light sensitive diode 200 is used to detect the level of light in the surrounding environment. In one embodiment, light sensitive diode 200 is always exposed to the surrounding light environment, and an electronic shutter is used to prevent the capacitor in light sensitive diode 200 from accumulating charge in a fashion similar to how a mechanical shutter prevents light from reaching the film in a conventional film camera. After the level has been detected for a specified period of time, signal processing unit 210, in step 302, determines if there is a pulse that is detected from pulse generator 208. As stated above, pulse generator 208 will generate pulses in accordance with the signal received from level detector 204.

If there are no pulses detected from pulse generator 208, operations will continue with step 304, where signal processing unit 210 will adjust the compare voltage level generated by compare voltage generator 206. In one embodiment, the compare voltage generator will continue to lower the compare voltage level until a pulse is detected from pulse generator 208. In another embodiment, compare voltage generator will start from a predetermined level of compare voltage which is approximately the midpoint between the highest expected signal level expected from amplifier 202 and increase or decrease the compare voltage as necessary. It is to be noted that in the case where the compare voltage has to be lowered as the intensity of the light detected by light sensitive diode 200 is very low (and thus the output of amplifier 202 is very low), signal processing unit 210 will not only lower the compare voltage generated by compare voltage generator 206 until it equals the output of amplifier 202, but continue to lower the compare voltage until the compare voltage is lower than the peak voltage of the signal generated by amplifier 202. This is because the compare voltage is preferably useful throughout a range of lighting conditions, such as when the camera is moved away from the light source for a brief period of time.

In step 306, after the level of the compare voltage has been lowered, signal processing unit 210 will determine if the lowest compare voltage level has been reached. If the lowest compare voltage level has been reached, this means that the camera is operating in an environment where the light source is a non-flickering light source, and signal processing unit 210 will output to indicate that a non-flickering source has been detected. This occurs in step 308.

Returning to step 302, if a pulse is detected from pulse generator 208, then operation will continue with step 310. In step 310, signal processing unit 210 will determine the pulse rate that is received from pulse generator 208. As the pulse rate is directly correlated to the frequency of the oscillating light level detected by light sensitive diode 200, the flicker frequency of the light source can be determined in step 312, as described in step 312. In one embodiment, a pulse would be generated every time the signal received from amplifier 202 by level detector 204 is higher than the signal received from compare voltage generator 206. In another embodiment, a pulse would be generated both when the signal received from amplifier 202 by level detector 204 is higher than the signal received from compare voltage generator 206, and when the signal received from compare voltage generator 206 by level detector 204 is higher than the signal received by amplifier 202. In the second embodiment, the system measures the two intersections per cycle due to the signal generated by the amplifier being equal to the signal generated by compare voltage generator 206.

After step 310, when the pulse rate has been determined, signal processing unit 210 will determine the flicker frequency in step 312. In one embodiment, the flicker frequency will equal to the number of pulses received from pulse generator 208 if pulse generator 208 only generates a pulse when the signal received from amplifier 202 by level detector 204 is greater than the voltage received from compare voltage generator 206. In another embodiment, the flicker frequency can be determined by measuring the time it takes to receive a predetermined number of pulses.

Once the flicker frequency has been determined in step 312, signal processing unit 210 will output a signal which represents the flicker frequency. In one embodiment, signal processing unit 210 will output a signal that signals whether a 50 Hz or 60 Hz system has been detected. In another embodiment, signal processing unit 210 will output the actual frequency that is detected. If the light source is a non-flickering source, this would have been determined in step 306, above. Signal processing unit 210 will output the light source intensity oscillating frequency signal to capture control unit 106 in step 314, to inform capture control unit 106 of the detected light source frequency.

By outputting the actual frequency of the oscillation of the light source intensity, the present invention is not limited to eliminating flicker effects from captured video only in 50 Hz or 60 Hz systems. For example, in some extreme low light situations, where the only light source that is provided is from a user's computer monitor, flicker effects can be eliminated if the system outputs the actual frequency of the light detected. This is because most monitor have a refresh rate that begins from 60 Hz. For example, if a scene is illuminated from a monitor that has a refresh rate of 75 Hz, the camera has to be able to synchronize the video frame capture to the refresh rate of the monitor.

Figure 5:
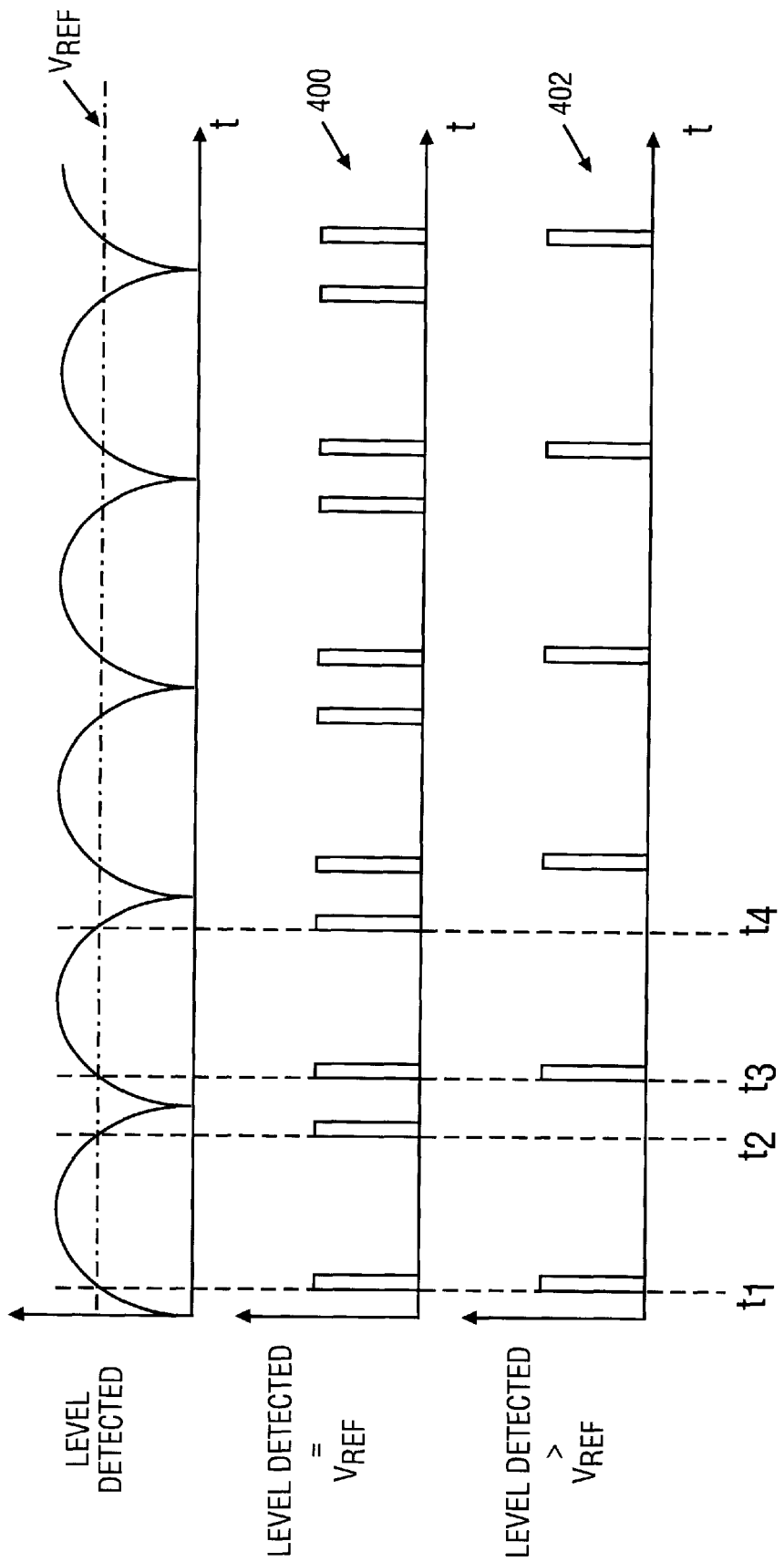
FIG. 5 is a timing diagram containing the output from two embodiments of the present invention.

FIG. 5 is a diagram illustrating the pulses generated by two different embodiments of the present invention where (1) each pulse in a set of pulses 400 is generated whenever the signal from amplifier 202 that is detected by level detector 204 is equal to the signal received from compare voltage generator 206; or (2) each pulse in a set of pulses 402 is generated whenever the signal received from amplifier 202 by level detector 204 becomes greater than compare voltage generator 206.

For example, the signal generated by amplifier 202 is equal to the signal from compare voltage generator 206 at times t1, t2, t3 and t4. Thus, in set of pulses 400, a pulse is generated starting at times t1, t2, t3, and t4. The flicker frequency can them be determined by examining the timing of the generation of these pulses.

In another example, the signal generated by amplifier 202 is greater than the signal received from compare voltage generator 206 at times t1 and t3. Thus, in set of pulses 402, a pulse is generated when the signal generated by amplifier 202 reaches the threshold. The flicker frequency is then determined by examining the time period between the generation of the pulse at t1 and at t3.

Although not shown in FIG. 5, it is to be noted that a pulse can be generated when the signal from amplifier 202 becomes lower than the signal from compare voltage generator 206. In this scenario, a pulse would be generated at times t2 and t4.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. An apparatus comprising:
   a light sensitive diode for detecting a light intensity level from a light source;
   a level detector coupled to said light sensitive diode for comparing said detected light intensity level with a predetermined level;
   a pulse generator coupled to said level detector for generating a set of pulses based on an output from said level detector; and, a signal processing unit coupled to (1) said pulse generator to determine an oscillating frequency of said light source based upon a pulse rate of the set of pulses and (2) the level detector to adjust the predetermined level in response to the pulse rate.

2. The apparatus of claim 1, further comprising a photo sensor array, wherein said light sensitive diode and said photo sensor array are integrated onto an integrated circuit.

3. The apparatus of claim 2, wherein said light sensitive diode is a photo sensor in said photo sensor array.

4. The apparatus of claim 3, wherein said photo sensor is controlled separately from other photo sensors in said photo sensor array.

5. The apparatus of claim 1 wherein the signal processing unit is to lower the predetermined level in response to the pulse rate being essentially zero.

6. The apparatus of claim 5 wherein the signal processing unit is to indicate that the light source is non-flickering if the predetermined level has been lowered to is lowest level.

7. An apparatus comprising:
   a photosensor array;
   an analog-to-digital unit;
   a capture control unit coupled to said photosensor array and said analog-to-digital unit;
   an image processing and control unit coupled to said capture control unit
   a storage unit coupled to said image processing and control unit;
   a flicker detector coupled to said capture control unit having:
      a light sensitive diode for detecting a light intensity level from a light source;
      a level detector coupled to said light sensitive diode for comparing said detected light intensity level with a predetermined level;
      a pulse generator coupled to said level detector for generating a set of pulses based on an output from said level detector; and,
      a signal processing unit coupled to (1) said pulse generator and said capture control unit to determine an oscillating frequency of said light source based upon a pulse rate of the set of pulses, and (2) the level detector to adjust the predetermined level in response to the pulse rate.

8. The apparatus of claim 7, wherein said flicker detector and said photosensor are integrated on an integrated circuit.

9. The apparatus of claim 7 wherein the signal processing unit is to lower the predetermined level in response to the pulse rate being essentially zero.

10. The apparatus of claim 9 wherein the signal processing unit is to indicate that the light source is non-flickering if the predetermined level has been lowered to its lowest level.

* * * * *

UNITED STATES PATENT AND TRADEMARK OFFICE
CERTIFICATE OF CORRECTION

PATENT NO. : 6,295,085 B1
DATED : September 25, 2001
INVENTOR(S) : Munson et al.

It is certified that error appears in the above-identified patent and that said Letters Patent is hereby corrected as shown below:

<u>Column 4,</u>
Line 6, delete "AID", insert -- A/D --.

Signed and Sealed this

Seventh Day of May, 2002

Attest:

JAMES E. ROGAN
*Attesting Officer*     *Director of the United States Patent and Trademark Office*